S. W. BISHOP.
SOCK SUPPORTER.
APPLICATION FILED JUNE 4, 1908.

914,380.

Patented Mar. 9, 1909.

Stephen W. Bishop
Inventor,

Witnesses:

By C. A. Snow & Co.
Attorneys.

UNITED STATES PATENT OFFICE.

STEPHEN WARD BISHOP, OF NEWBERRY, FLORIDA.

SOCK-SUPPORTER.

No. 914,380.  Specification of Letters Patent.  Patented March 9, 1909.

Application filed June 4, 1908. Serial No. 436,683.

*To all whom it may concern:*

Be it known that I, STEPHEN W. BISHOP, a citizen of the United States, residing at Newberry, in the county of Alachua and State of Florida, have invented a new and useful Sock-Supporter, of which the following is a specification.

This invention relates to hose supporters for use by men.

The object of the invention is to provide an article of this character in which the use of a clasp for securing the garter around the leg is dispensed with, and in which the supporter subserves the dual function of a garter-holder and a hose engaging and sustaining clip.

The supporter embodies a plate having at one end friction slot, and at its other end a pair of clamps in the form of a clip and tongue that are adapted to engage with the elastic webbing or garter and hold the same positively positioned on the leg of the user.

The supporter may be made of any suitable material, preferably of a non-oxidizable resilient metal, and is to be light in weight, and neat and finished in appearance.

The invention consists in the various and novel details of construction of a hose supporter, that will be hereinafter fully described and claimed.

Figure 1:
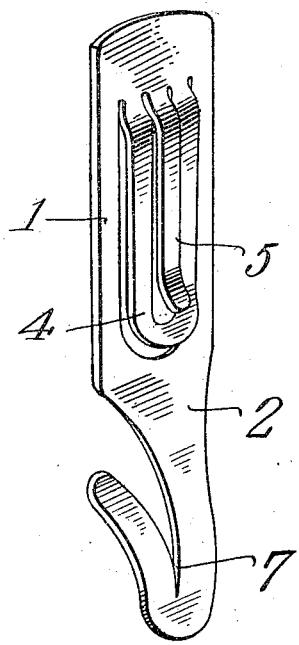
Figure 2:
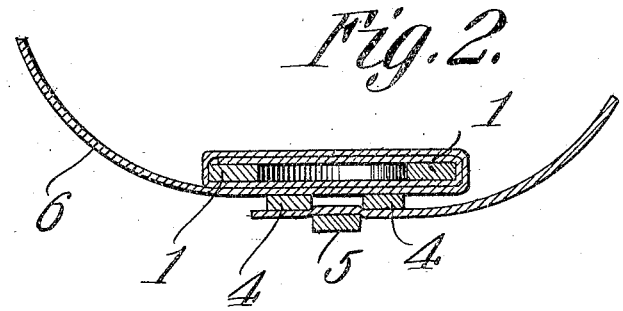

In the accompanying drawings forming a part of the specification, and in which like characters of reference indicate corresponding parts:—Figure 1 is a view in perspective of the supporter. Fig. 2 is a view in horizontal section showing the manner in which the garter is assembled with the supporter.

The supporter comprises a body 1, one end of which is provided with a tapered extension 2, terminating in a friction slot 7. The body is provided with two longitudinally disposed clamping members in the form of a resilient clip 4 and a tongue 5, the clip is approximately U-shaped when viewed from the face of the body, and the tongue straight. These clamping members are integral with the body and are formed by being stamped therefrom, and the free end of each is curved away from the body to form entering throats to receive the elastic webbing 6 that constitutes the garter. Each of the members is also outwardly curved or bowed at its point of juncture with the body in order to space the members a suitable distance therefrom.

The supporter may be made of any suitable metal, preferably one that is non-oxidizable, resilient, and light in weight in order not to prove objectionable in use.

In securing the supporter on the leg, one end of the webbing is placed transversely around the back of the body, and the other end is then passed twice around the body and beneath the resilient clip 4 thereby forming a pad between the supporter and the leg. The free end is then carried around the leg and is secured by being passed between the clip 4 and tongue 5, as clearly shown in Fig. 2, thus positively securing the webbing against slipping. It will be observed by this manner of securing the garter in place, that the user may regulate its tension as desired without changing the adjustments of certain parts as is necessary with the ordinary hose supporters such as are in common use. The sock is gripped in the slot 7 in the usual manner, that is to say, by forcing or pinching a portion of the upper end thereof into the crotch of said slot.

The improvements herein defined, while simple in character, will be found thoroughly efficient for the purposes designed and will possess points of advantage over the ordinary sock supporter inasmuch as the employment of a clasp to hold the garter in position is dispensed with.

Having described the invention what I desire to secure by Letters-Patent is:—

1. A supporter of the class described comprising a plate provided with a terminal apparel-engaging slot, said plate being stamped to form a resilient clip, and the clip being stamped to form a resilient tongue.

2. A supporter of the class described comprising a plate provided with a terminal apparel-engaging slot, said plate being stamped to form a resilient off-set clip, and the clip being stamped to form a resilient off-set tongue.

3. A supporter of the class described comprising a plate provided with a terminal apparel-engaging slot, said plate being stamped to form a resilient clip, the clip being stamped to form a resilient tongue, the said tongue extending between spaced portions of the tongue, and a length of elastic wrapped at one end around the plate and between the same and the said clip and engaged at its other end between the clip and the tongue struck up therefrom.

In testimony that I claim the foregoing as my own, I have hereto affixed my signature in the presence of two witnesses.

STEPHEN WARD BISHOP.

Witnesses:
C. N. McArthur,
E. T. Henderson.